2 Sheets—Sheet 1.

C. L. HAIGHT.

HEATER.

No. 11,190. Reissued Sept. 15, 1891.

WITNESSES

T. W. Barwell

W. B. Corwin

INVENTOR

Charles L. Haight

THE NORRIS PETERS CO., PHOTO-LITHO., WASHINGTON, D. C.

C. L. HAIGHT.

HEATER.

No. 11,190. Reissued Sept. 15, 1891.

WITNESSES

J. W. Bakewell

W. B. Cunnin

INVENTOR

Charles L. Haight

THE NORRIS PETERS CO., PHOTO-LITHO., WASHINGTON, D. C.

UNITED STATES PATENT OFFICE.

CHARLES LENARD HAIGHT, OF PITTSBURG, PENNSYLVANIA.

HEATER.

SPECIFICATION forming part of Reissued Letters Patent No. 11,190, dated September 15, 1891.

Original No. 428,336, dated May 20, 1890. Application for reissue filed September 25, 1890. Serial No. 366,568.

*To all whom it may concern:*

Be it known that I, CHARLES LENARD HAIGHT, of Pittsburg, in the county of Allegheny and State of Pennsylvania, have invented a new and useful Improvement in Heaters, of which the following is a full, clear, and exact description.

My invention relates to an improvement in heaters especially adapted for use in connection with natural-gas burners, and has for its object to concentrate the ignited gas at the burner and conduct the heat generated thereby, together with the waste products of combustion, downward through a heater to a point at or near the floor-line, and from thence upward through and out from the heater to the flue in which the burner is located.

A further object of the invention is to provide a device of simple and durable construction capable of being applied to and used in connection with any form of burner.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1:
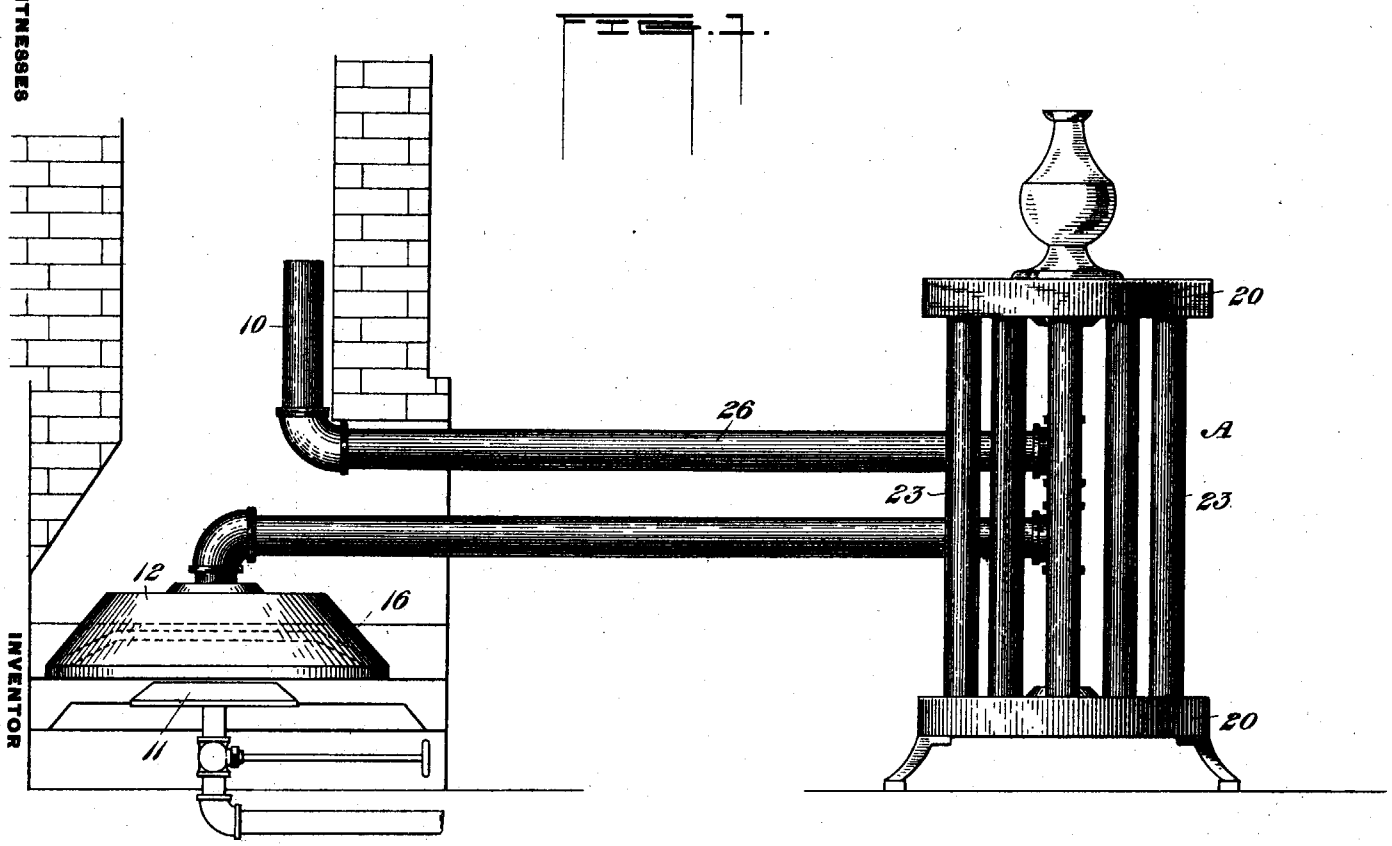
Figure 2:
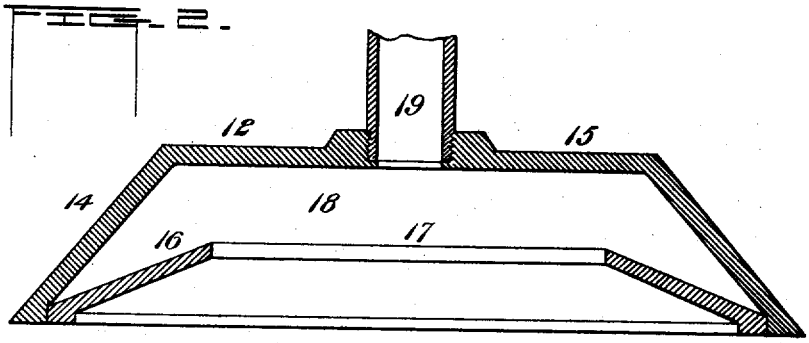
Figure 3:
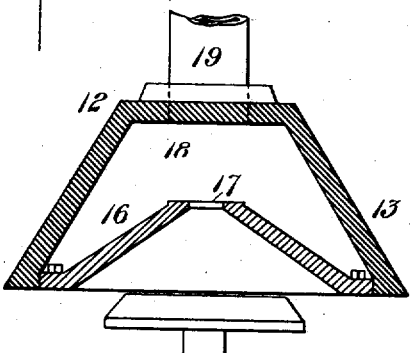
Figure 4:
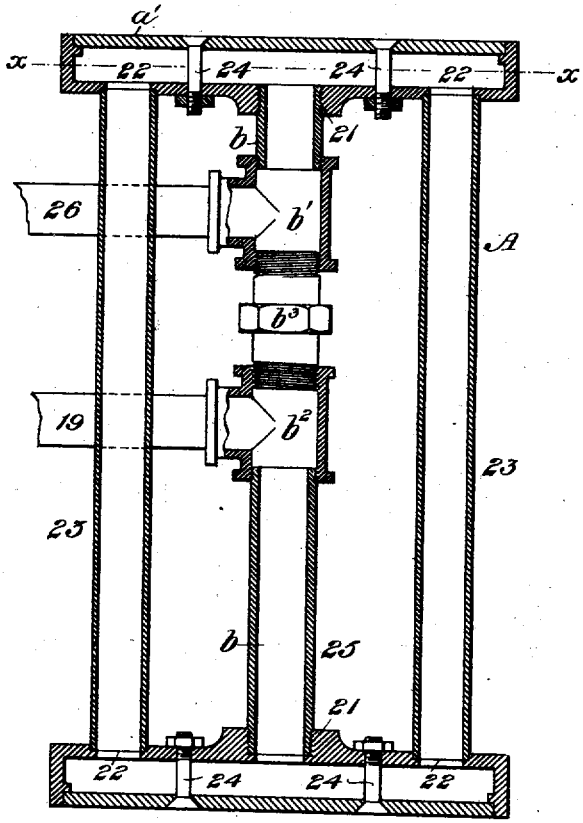
Figure 5:
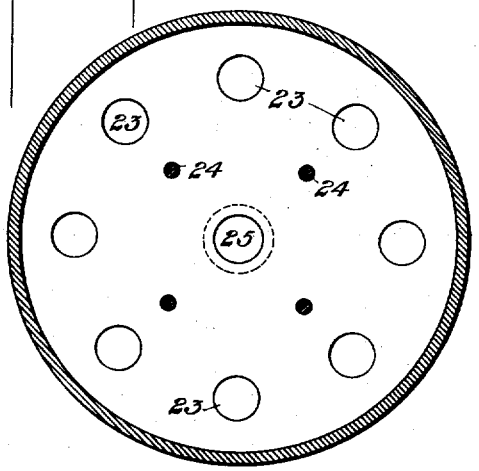

Figure 1 is a side elevation of the device. Fig. 2 is a longitudinal section through the hood adapted to be placed over the burner, and Fig. 3 is a transverse section through the same. Fig. 4 is a central vertical section through the drum, and Fig. 5 is a transverse section through the upper portion of the drum on line $x$ $x$ of Fig. 4.

Within the fire-place of a chimney or flue 10 a burner 11 is located, of any approved pattern, especially a burner adapted for use with natural gas. Over the burner a hood 12 is supported in any suitable or approved manner, which hood is preferably made of greater length than width and provided with downwardly and outwardly inclined sides and ends 13 and 14 and a flat top 15, as shown in Figs. 2 and 3. This hood, which acts as a concentrating-cap, is preferably provided with an inner cap or hood 16, of similar construction to the outer hood, open at the bottom, and provided with a longitudinal slot 17, preferably located at the center of its upper surface. This inner hood is of sufficient size to neatly fit into the outer hood, and the height of the inner hood is such that quite a spacious chamber 18 is obtained between the opposed surfaces of the two hoods. In the ordinary construction of this duplex hood the inner hood is bolted or otherwise secured to the outer hood at or near the base of the latter. In the upper, preferably central, portion of the outer hood 12 a threaded aperture is produced, in which one end of a pipe 19 is screwed or otherwise secured, which pipe is led from above the hoods to a connection with the central stand-pipe of a drum A.

The drum is preferably constructed in the following manner: Two tubular heads 20 are formed of any suitable or desired contour, one being adapted to constitute the top and the other the bottom of the drum. In the opposed faces of the heads 20, at the center of the same, an interiorly-threaded aperture 21 is formed, and near the periphery upon said opposed faces of the heads a series of circular openings 22 is produced, the walls of which openings upon the outer faces of the heads are chamfered or rabbeted to receive the ends of tubes 23. The heads 20 are preferably made in two pieces—namely, a dish-like section $a$, in which the openings 22 and the threaded aperture are produced, and a second section $a'$, the latter consisting of a plate adapted to rest upon a flange or flanges formed upon the inner face of the dish-section, as best shown in Fig. 4—and the two sections are united in any suitable or approved manner, ordinarily through the medium of bolts 24.

The central tube or stand-pipe 25 of the drum is constructed in the following manner: Into each central threaded aperture of each head 20 a section of pipe $b$ is screwed, the upper section being preferably the smaller, and upon the lower end of the upper section and the upper end of the lower section of the pipes $b$ T-fittings $b'$ and $b^2$ are secured. Into the opposed ends of the T-fittings $b'$ and $b^2$ a nut $b^5$ is screwed, which nut consists of a central polygonal section and threaded ends, one end of the nut being provided with a right-hand thread and the other with a left-hand thread. Thus when the parts of the drum have been put together, as above described, and the nut $b^3$ is screwed to place the sections $b$ of the stand-pipe 25 and their T-fittings are drawn together, whereby the heads 20 are made to approach one another, and thereby clamp the outer tubes 23 in their seats in the heads. Into the lower T-fitting $b^2$ the outer end of the pipe 19, leading from the hoods, is entered, and into the upper fitting a second heat-conducting pipe 26 is screwed, the other end of which pipe is carried into the flue and upturned, as best shown in Fig. 1.

In operation the ignited gas passing from the burner, being very light, ascends rapidly into the hoods 12 and 16, whereby it is rendered more or less concentrated and compact, and from thence the heat and waste products of combustion pass through the supply-pipe 19 into the lower section of the stand-pipe 25 of the drum. From the lower section of the stand-pipe the gas and waste products of combustion enter the lower head 20, and from thence pass through the various tubes 23 to the upper head of the drum and down into the upper section of the central stand-pipe 25, and out from said upper section into the pipe 26 to an exit through the flue 10.

It will be observed from the foregoing description that the heat of the gas is utilized to a maximum extent, and in a simple manner applicable to any burner used in connection with natural gas.

My apparatus retains all the advantages of the ordinary open gas fire-place, since the flame from the burner below the hood is visible in the room and the ventilation of the chimney is still secured, while any gas or products of combustion not carried off through the heater, but escaping from the drum, will pass off by way of the chimney-flue.

I do not confine myself to any particular form of the heater, as its shape may be greatly varied.

Having thus described my invention, I claim as new and desire to secure by Letters Patent—

1. The combination, with a burner and a heater, of a duplex hood, the inner hood having an opening in its upper portion, the said duplex hood being adapted for suspension above the burner, and a connection between the outer of the two hoods and the said heater, substantially as and for the purposes described.

2. The combination, with a burner and the stand-pipe of a heater, said stand-pipe constructed with two chambers connected with each other by a series of chambers and pipes, of a hood suspended over the burner, having an open bottom and downwardly and outwardly flaring sides and ends, a tubular connection between the hood and one chamber of the heater, and an exit-tube connected with the other chamber of the heater, substantially as shown and described.

3. A heater consisting of two heads, pipes connecting said heads, and a central stand-pipe divided into two disconnected sections, substantially as shown and described, and for the purpose specified.

4. A heater consisting of two heads, a series of tubes loosely entered into said heads, a central stand-pipe divided into two sections, one section being screwed into each head, and a solid nut provided with a right and left hand thread uniting the two sections of the stand-pipe, substantially as shown and described.

5. The combination, with a burner, of a heater having two heads and pipes connecting said heads, a pipe leading from the burner and discharging into the middle part of one head, and an outlet-pipe leading from the middle part of the other head, substantially as and for the purposes described.

6. The combination, with a burner, of a hood for collecting the products of combustion therefrom, a pipe leading from the burner, and a heater connected with said pipe and having a passage leading downward from said pipe and thence upwardly, and an exit-flue, whereby the hot gases are conveyed in said heater downwardly toward the floor and then in an upward direction, substantially as and for the purposes described.

In testimony whereof I have hereunto set my hand this 22d day of September, A. D. 1890.

CHARLES LENARD HAIGHT.

Witnesses:
T. W. BAKEWELL,
H. M. CORWIN.